Patented July 12, 1938

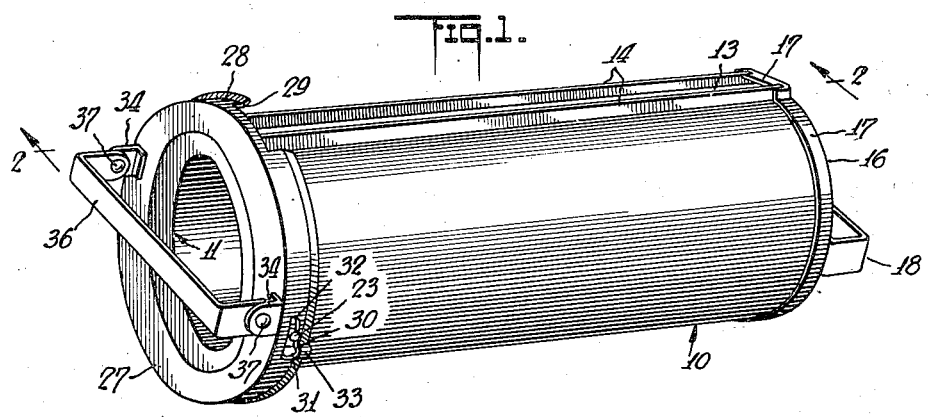
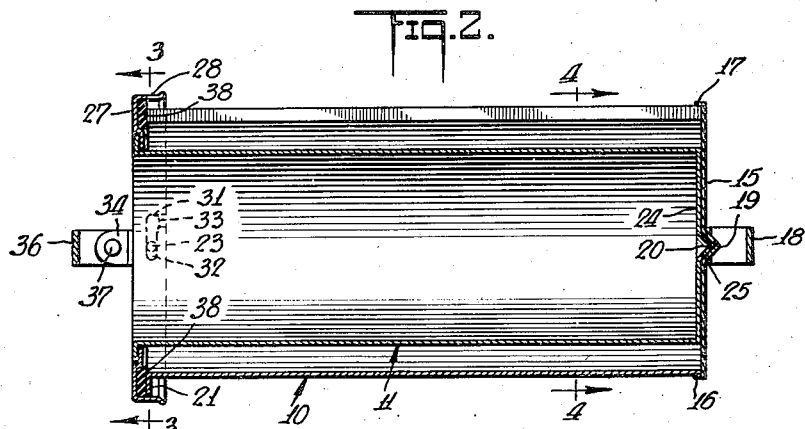
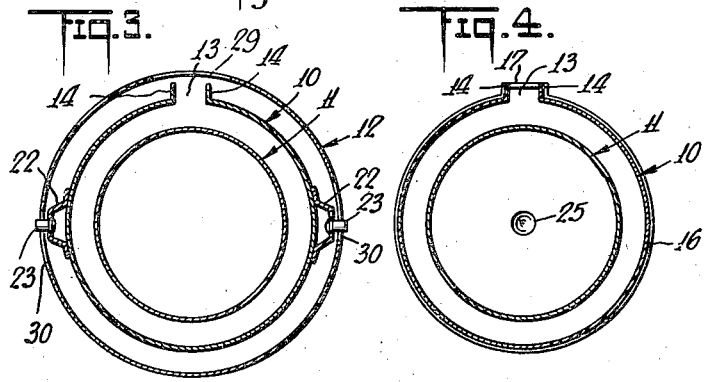
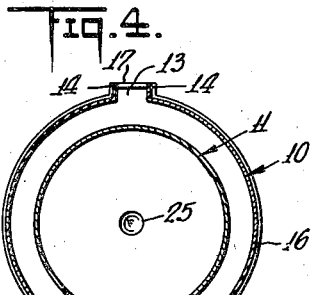
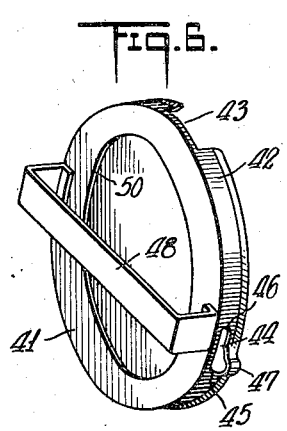
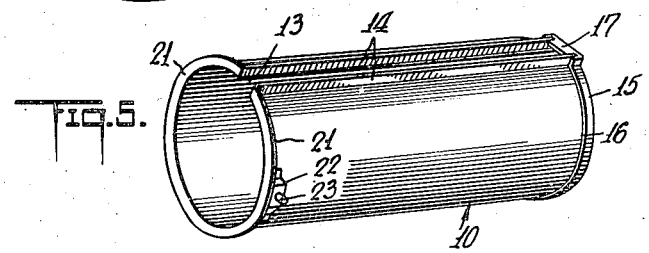

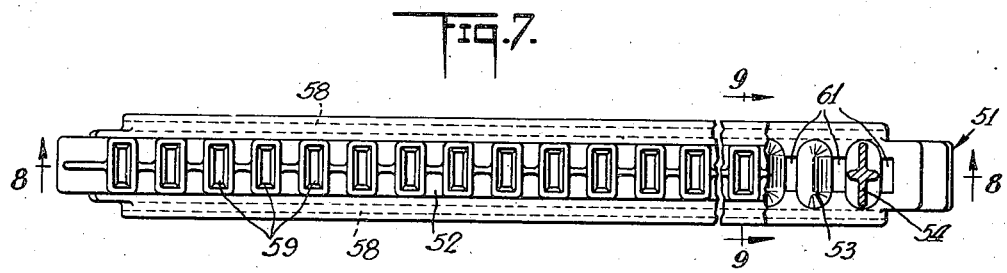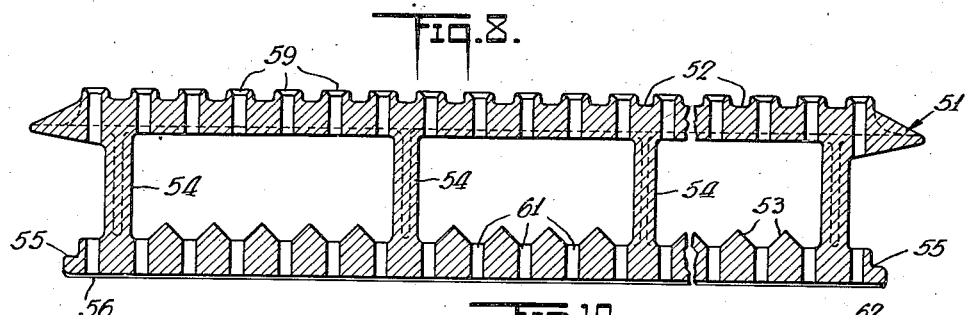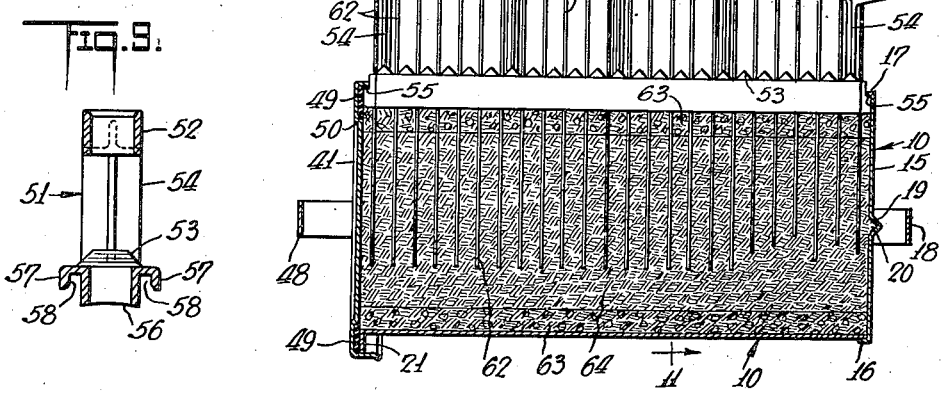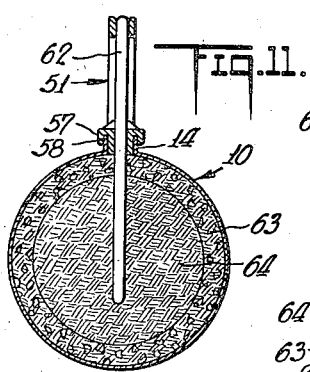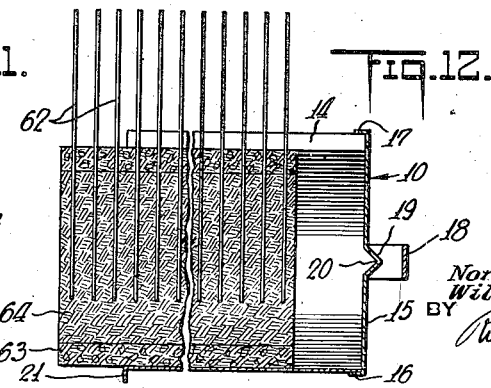

2,123,836

UNITED STATES PATENT OFFICE 2,123,836

APPARATUS FOR MOLDING CONFECTIONERY PRODUCTS

Norman M. Thomas, Brooklyn, and William J. Taylor, Syracuse, N. Y., assignors to Joe Lowe Corporation, New York, N. Y., a corporation of Delaware Application March 17, 1937, Serial No. 131,538

15 Claims. (Cl. 107—19)

The present invention relates to apparatus for forming, refrigerating and harvesting frozen stick confectionery products consisting of a combination of different substances and/or flavors, and it has particular relation to apparatus suitable for manufacturing confections of the above-described character in accordance with the method described in the co-pending application of Abraham H. Bayer, Serial Number 131,321, filed March 17, 1937, for Improvements in frozen confectionery product and method of making the same.

An object of the present invention is to provide new and improved molding apparatus suitable for simultaneously manufacturing a plurality of frozen stick confectionery products consisting of a combination of substances and/or flavors in a most efficient, sanitary and economical manner.

Another object of the invention is the provision of simple and highly efficient apparatus of the character described, which is highly sanitary and easy to clean, and relatively simple and inexpensive to make.

A further object of the invention is to provide suitable molding apparatus capable of manufacturing a plurality of stick confectionery products having an outer ring of one substance and an inner core made of an entirely different substance and/or flavor of the same substance.

Another object of the invention is the provision of suitable molding apparatus capable of producing a molded hollow shell.

A further object of the invention is to provide a simple and inexpensive stick positioning device suitable for spacing and gauging the position of a plurality of handle sticks in the substances to be frozen in the molding apparatus.

Another object of the invention is the provision of suitable apparatus for manufacturing a plurality of cylindrical disk-like confectionery products having an inner core of one substance and an outer ring of another substance, and providing means for inserting a plurality of handle sticks in spaced relation in said substance during the process of manufacture.

Other and further objects and advantages of the invention reside in the detailed construction of the apparatus, which result in simplicity, economy and efficiency, and which will be apparent from the following description, wherein a preferred form of embodiment of the invention is shown, reference being had to the accompanying drawings, forming a part hereof, in which:

Fig. 1 is a perspective view of a mold assembly constructed in accordance with the invention;

Fig. 2 is a longitudinal sectional view of the mold assembly shown in Fig. 1, the same being taken along the line 2—2 thereof, looking in the direction of the arrows;

Fig. 3 is a cross-sectional view of the mold assembly shown in Fig. 2, the same being taken along the line 3—3 thereof, looking in the direction of the arrows;

Fig. 4 is another cross-sectional view of the mold assembly shown in Fig. 2, the same being taken along the line 4—4 thereof, looking in the direction of the arrows;

Fig. 5 is a perspective view of the outer mold shown in Fig. 1, with the inner mold and its combination cover for the outer mold removed therefrom;

Fig. 6 is a perspective view of a second cover for use in closing the open end of the outer mold shown in Fig. 5, when it is being used without the inner mold unit;

Fig. 7 is a top plan view of the stick positioning device adapted to be mounted on the flanges of the outer mold and over the longitudinal opening extending along the top side thereof;

Fig. 8 is a longitudinal sectional view of the stick positioning device shown in Fig. 7, the same being taken along the line 8—8 thereof, looking in the direction of the arrows;

Fig. 9 is a cross-sectional view of the stick positioning device shown in Fig. 7, the same being taken along the line 9—9 thereof, looking in the direction of the arrows;

Fig. 10 is a longitudinal sectional view of the mold assembly shown in Fig. 1 with the stick positioning device shown in operating cooperation therewith, and illustrating the method of positioning the handle sticks in the frozen substances in the mold;

Fig. 11 is a cross-sectional view of the mold assembly, stick positioning device and contents shown in Fig. 10, the same being taken along the line 11—11 thereof, and looking in the direction of the arrows;

Fig. 12 is a fragmentary longitudinal sectional view of the mold assembly and contents shown in Fig. 10, showing the same with the stick positioning device removed and illustrating the manner of withdrawing the frozen contents therefrom by their handle members.

Referring now to the drawings and particularly to Figs. 1 to 5 thereof, there is shown a mold assembly consisting of two concentrically spaced molds 10 and 11 made of any suitable non-rusting metals.

The larger or outer mold structure 10, as best shown in Fig. 5, is of a tubular sheet metal construction having a single horizontal cavity of a substantial length relative to its width dimensions, and provided with a longitudinal opening or slot 13 extending along the entire length of the top side thereof, said opening 13 being flanked with suitable flanges 14 extending radially upward from the outer mold surface. The back or rear end of the mold 10 is permanently closed by a cap 15 having an axial flange 16 welded or otherwise suitably secured thereto, except where it bridges the opening 13, as indicated at 17. The cap 15 is provided with a suitable handle member 18 mounted horizontally thereof to facilitate handling of the mold structure 10. The cap 15 is also provided with an outwardly extending axial projection 19 (see Fig. 2) of conical shape, forming an inner axial recess 20. The front end of the mold 10 is open and is provided with a circumferential flange 21 extending radially upward from the mold surface thereof. A pair of supporting brackets 22 are suitably secured to the outer surface of the mold 10 adjacent the flange 21 and on opposite sides of the open end thereof, and carry studs 23 mounted thereon projecting slightly above the top of the flange 21.

The inner or smaller mold 11 is of tubular construction having a single horizontal cavity of a substantial length relative to its width dimensions, and being provided with a closed rear end 24 having an axial conical projection 25. The open end of the mold 11 is axially mounted in a circumferentially extending flange member 27 by welding, etc. The flange member 27 is of sufficient size to act as a cover member for the open end of the mold 10, and is provided with a relatively wide axially extending flange 28 adapted to fit snugly over the circumferential flange 21 of the mold 10. A portion of the flange 28 is cut away, as indicated at 29, to permit access to the opening 13 in the mold 10. Circumferentially extending slots 30 are provided in the flange 28 on opposite sides of the cover 27, which slots 30 have an enlarged end 31 and a small end 32. Adjacent the enlarged ends 31 of the slots 30, the flange 28 is budged outwardly to provide a tunnel-like passage way 33 therebeneath. Brackets 34 are secured to the front of the flange member 27 on opposite sides of the open end of the mold 11 extending therethrough. A handle 36 is pivotally mounted on said brackets 34 by means of a rivet 37. This handle 36 is made pivotal so that it can be turned to one side to permit easier access to the hollow cavity of the mold 11. A packing ring 38, made of fibre, rubber or other suitable material, is mounted on the inside of the circumferential flange 27 between the mold 11 and adjacent the underside of the axial flange 28 projecting backwardly from the outer edges of the flange 27.

A second or auxiliary cover member 41, best shown in Fig. 6, is provided for closing the open end of the mold 10 when it is used separately from the mold 11 and its combination flanged cover member 27. This auxiliary cover member 41 is constructed similarly to the cover member 27, and is provided with a relatively wide axially extending flange 42 adapted to fit snugly over the circumferential flange 21 of the mold 10. A portion of the flange 42 is cut away, as indicated at 43, to permit access to the opening 13 in the mold 10 when the same is positioned over the open end thereof. Circumferentially extending slots 44 are provided in the flange 42 on opposite sides of the cover 41, which slots 44 have an enlarged end 45 and a small end 46. Adjacent the enlarged ends 45 of the slots 44, the flange 42 is bulged outwardly to provide a tunnel-like passage way 47 therebeneath. A handle 48 is mounted horizontally across the front of the cover 41 in any suitable manner. A packing ring 49, similar to the packing ring 38, is mounted on the inside of the cover 41, as best shown in Fig. 10, in the channel provided therein by slightly depressing the center of the cover as indicated at 50.

The stick positioning device 51, shown in Figs. 7 to 11 inclusive, consists generally of a casting made preferably of aluminum or other suitable light weight and non-tarnishing material, having dimensions corresponding to the opening 13 of the mold 10. The casting 51 is of integral construction and consists of an upper frame 52 and a lower frame 53 suitably connected by spaced vertical uprights. 54. The lower frame 53 is provided with off-set shoulders 55 at each end thereof, and a concaved bottom 56 which projects below the lower frame 53 thereof. Projecting outwardly and downwardly from the sides of the frame 53 adjacent the top thereof are flanges 57, forming channels 58 extending longitudinally thereof. Transversely extending slots 59 are spaced longitudinally of the upper frame 52 and similar slots 61 are spaced correspondingly of the lower frame 53, the slots 59 and 61 being in vertical alignment and are adapted to receive wooden handle sticks 62.

In utilizing the apparatus in the manufacture of frozen stick confectionery products, the mold 11 is mounted in the mold 10, the conical axial projection 25 on the rear end of the mold 11 being inserted in the conical recess 20 on the rear end of the mold 10, and the flange 28 of the cover member 27 being passed over the flange 21 of the mold 10 until the packing ring 38 is pressed tightly against the front face of the flange 21. In this position the studs 23 of the mold 10 have passed through the tunnel-like passage ways 33 and are extending through the enlarged ends 32 of the slots 30 in the flange 28 of the cover member 27. By turning the cover 27 by means of the handle 36 clockwise with respect to the mold 10, the small ends 32 of the slots 30 will be moved into locking engagement with the studs 23 and frictionally hold the cover 27 in place on the mold 10.

The mold assembly is now ready to be filled with a substance 63 to be frozen by pouring the same through the slotted opening 13 in the top side of the mold 10, which substance will flow into and fill the annular space formed by the concentrically spaced molds 10 and 11. The mold assembly is now ready to be frozen in any suitable manner such as storing in a refrigerated room (not shown) for a sufficient period of time. After the substance 63 is frozen, the hollow center or cavity of the mold 11 is treated with a warm fluid (not shown) to melt the bond formed between the outer surface of the mold 11 and the frozen substance 63. By turning the combination mold 11 and cover 27 in a counter-clockwise direction to release the studs 23 from the slots 30, the mold 11 may be withdrawn from the mold 10, leaving an axial cavity formed therein in the frozen substance 63.

The mold 10 is now turned to a vertical position with the open end extending upwardly, and the cavity in the frozen substance 63 is filled in any suitable manner with a second substance 64, which may be of a different flavor, of a contrasting color or of another material. When this cavity is completely filled, the cap 41 is positioned over the open end of the mold 10 in the same manner as heretofore described for the flanged cover member 27 with the studs 23 locked in the small ends 46 of the slots 44 and the packing ring 49 tightly pressed against the front face of the flange 21 of the mold 10.

The mold 10 is now ready to be placed in a horizontal position with the opening 13 at the top, and the stick positioning device 51 is mounted thereon, the channels 58 engaging the upstanding radial flanges 14 thereof and an offset shoulder 55 extending under the bridged portion 17 of the flange 16 of the cap 15, which acts as a guide and holding means for the stick positioning device 51. With the device 51 being symmetrical, it will be obvious that either end may be inserted under the bridge 17 of the flange 16. The downwardly extending curved base 56 is of the same radius as the mold 10, and serves to complete the missing segment of the cylindrical mold 10 between the flanges 14 of the opening 13 thereof, and also serves to form and shape the substance 63 during the second freezing thereof. Sticks 62 are now ready to be manually positioned in the openings 59 of the frame 52, which sticks 62 will pass therethrough and through the aligned openings 61 of the lower frame 53 into the mold 10 through the opening 13 thereof until they come into contact with the frozen mass 63 therein. The sticks 62 are now manually forced through the frozen substance 63 and into the unfrozen substance 64 until the tops thereof are flush with the top of the frame 52 of the device 51. Thus, it will be apparent that the stick positioning device 51 not only acts as a spacer for the sticks 62 but also acts as a guide for gauging the distance to which they may be inserted in the edible substances 63 and 64. The stick positioning device 51 may now, if desired, be removed from the mold 10 since the substances 63 and 64 are sufficiently plastic to maintain the sticks 62 in their respective positions. The mold 10 and contents 63 and 64, with the sticks 62 in proper position therein, is now ready to be placed into a refrigerating chamber (not shown) until the contents thereof are solidly frozen and bonded to the handle sticks 62.

To remove the frozen substances 63 and 64 from the mold 10 after the final refrigeration, the mold 10 is subjected to heat sufficient to melt the bond formed between the inside surface thereof and the frozen substance 63. The cover 41 is now ready to be removed in the manner heretofore described for removing the flanged cover member 27 of the mold 11. The frozen masses 63 and 64 which have been bonded to each other and to the handles 62 to form an integral unit may now be removed by grasping the protruding ends of the handle sticks 62 and sliding the same longitudinally out of the open end of the mold 10. To produce individual confections, each being provided with a handle stick 62, the mass may be divided in any suitable manner (not shown) between the respective handle sticks 62.

It will be obvious that the invention is not limited to cylindrically shaped molds and/or confectionery products, but that its features are easily adaptable for making confections of various shapes, and with equally numerous shaped centers, thereby providing two flavored or colored confectionery products of artistic shape and design having an attractive appearance. For example, the confections shown in the drawings are cylindrically shaped both as to the outer contour and to the shape of the inner core, making a product resembling what is commonly recognized as a "Bull's Eye". However, if the molds 10 and 11 were of square shape an entirely different design product would be produced. Furthermore, the outer mold 10 may be of one shape, such as cylindrical, square, rectangular, etc., while the inner mold may be of an entirely different shape, such as for example, triangular, diamond, club, heart or spade shape, thereby producing a novel product having a contour of one shape and an inner contrasting core or center of an entirely different and distinctive shape.

It is also perfectly obvious that the invention may be utilized to produce confections made of more than two substances by merely using more than one inner mold, said inner molds being of progressively smaller sizes and being of different shapes. It is apparent that the inner mold 11 therefore may be made of several concentric sizes to permit the manufacture of confectionery products having more than two substances such as specifically shown and described herein for illustrative purposes.

Although we have only described in detail one modification which our invention may assume, it will be apparent to those skilled in the art that the invention is not so limited, but that various other modifications may be made therein without departing from the spirit thereof or from the scope of the appended claims.

What we claim is:

1. In a mold assembly of the class described comprising, in combination, an outer tubular single cavity horizontal mold having one closed and one open end and having a relatively narrow continuous longitudinal opening along the top side thereof, said mold having means adjacent said open end for supporting a smaller inner mold in spaced relation therein, and, a smaller horizontal inner mold having one closed end and one open end, said inner mold having means adjacent its open end for engaging the supporting means of said outer mold and for closing the open end thereof.

2. In a mold assembly of the class described comprising, in combination, an outer tubular single cavity horizontal mold having one open end and having a relatively narrow opening extending longitudinally along the top side thereof, said opening extending inwardly from said open end and being in open communication therewith, means mounted adjacent said open end for receiving and locking a closure member therefor, and a smaller horizontal single cavity inner mold having one end open, said smaller mold having a radial flange adjacent the open end thereof for closing the open end of said larger mold when the same is positioned and spaced concentrically therein.

3. In a mold assembly of the class described comprising, in combination, outer and inner molds in spaced relation thereto, said outer mold consisting of a tubular member having a single horizontal cavity provided with one closed and one open end and having a relatively narrow continuous longitudinal opening along the top side thereof extending inwardly from said open end, said outer mold having means mounted adjacent each end thereof for receiving and supporting said inner mold, said inner mold consisting of a tubular member having a single horizontal cavity of smaller dimensions than the outer mold, said inner mold having cooperating means mounted adjacent each end thereof for engaging the corresponding means of said outer mold and supporting the same in spaced relation therein.

4. In a mold assembly of the class described comprising, in combination, an outer and inner mold mounted in spaced relation thereto, said outer mold consisting of a tubular member having a single horizontal cavity provided with one open and one closed end and having a relatively narrow continuous longitudinal opening extending along the top side thereof inwardly from said open end, said outer mold having locking means mounted adjacent said open end for locking against circumferential movement and positioning means mounted on said closed end; said inner mold consisting of a tubular member having a single horizontal cavity of smaller dimensions than the outer mold and being provided with an open end, means axially mounted adjacent said open end including a radial flange member adapted to act as a closure for the open end of said outer mold, said flange member having means mounted thereon for releasably engaging said locking means of the outer mold, the opposite end of said inner mold having means for engaging the positioning means of the outer mold when the closure member is locked in position thereon.

5. In a mold assembly of the class described comprising, in combination, an outer and inner mold mounted in spaced relation thereto, said outer mold consisting of a tubular member having a single horizontal cavity provided with one closed and one open end and having a relatively narrow continuous longitudinal opening extending along the top side thereof and communicating with said open end, said outer mold having locking means mounted transversely of said open end and positioning means mounted centrally of the closed end thereof; said inner mold consisting of a tubular member having a single horizontal cavity of smaller dimensions than the outer mold and being provided with an open end, means axially mounted adjacent said open end including a radial flange member adapted to act as a closure for the open end of said outer mold, said flange member having means mounted thereon for releaseably engaging said locking means of the outer mold, the opposite end of said inner mold having means for engaging the positioning means of the outer mold when the closure member is locked in position thereon.

6. Molding apparatus of the character described comprising a tubular mold being closed at one end and open at the opposite end and having a single horizontal cavity of a substantial length relative to its width dimensions, a relatively narrow slotted opening extending longitudinally of the top side thereof and being in open communication with said open end, means adjacent said open end for receiving a cover member, and a removable cover member having means for engaging the means adjacent said open end for closing the same.

7. Molding apparatus of the character described comprising a tubular mold being closed at one end and open at the opposite end and having a single horizontal cavity of a substantial length relative to its width dimensions, a slotted opening extending longitudinally of the top side thereof, means adjacent the edges of said slotted opening for supporting a stick centering and gauging device, means adjacent said open end for receiving a cover member, and a removable cover member for closing the same having means for engaging the means adjacent said open end when positioned thereon.

8. Molding apparatus of the character described comprising a tubular mold being closed at one end and open at the opposite end and having a single horizontal cavity of a substantial length relative to its width dimensions, said closed end having means for supporting and centering a second mold inwardly thereof, a handle member mounted on the outer side of said closed end, a slotted opening extending longitudinally of the top side thereof and having means radially mounted adjacent the edges thereof for supporting a stick centering device, means mounted radially of said open end for engaging a cover member, locking means mounted adjacent said open end for locking a cover member thereover, and a removable cover member for closing said open end having means for engaging said locking means, said cover member having a handle member mounted on the outer side thereof for manipulating the same.

9. In a mold assembly for making stick confectionery products comprising, in combination, a tubular single cavity mold having one end removable, said mold having a relatively narrow slotted opening extending longitudinally of the top side thereof and in open communication with said removable end, and a device for positioning and gauging sticks in the substance to be frozen in the mold, said device including a frame structure adapted to be positioned over said slotted opening in the top of said mold having a plurality of openings spaced longitudinally thereof for receiving sticks.

10. In a mold assembly for making stick confectionery products comprising, in combination, a tubular single cavity mold having one end removable, said mold having a slotted opening extending longitudinally of the top side thereof, said opening having supporting means mounted adjacent the side edges thereof, and a stick positioning and gauging device including a frame structure adapted to be positioned over said slotted opening in said mold, said frame structure having means for engaging the supporting means of said mold and having a plurality of vertically aligned stick receiving openings spaced longitudinally thereof.

11. In a mold assembly for making stick confectionery products comprising, in combination, a tubular single cavity mold having one removable end, said mold having a slotted opening extending longitudinally of the top side thereof, said opening having supporting means extending upwardly adjacent the sides thereof, and a stick positioning and gauging device including a frame structure adapted to be positioned over said slotted opening in said mold, said frame structure having means for engaging the supporting means of said mold and being provided with a downwardly projecting curved bottom for completing the cylindrical form of the mold and for forming and shaping the substance therebelow, said frame structure having a plurality of stick receiving openings extending transversely thereof and spaced longitudinally of the device.

12. Molding apparatus of the character described which comprises a tubular mold being closed at one end and open at the opposite end and having a single horizontal cavity of a substantial length relative to its width dimensions, said open end being axially mounted through a radial flange having an axial flange projecting from the outer edges thereof longitudinally toward the closed end of the mold, said axial flange containing means for removably locking the same to supporting means therefor.

13. Molding apparatus of the character described which comprises a tubular mold being closed at one end and open at the opposite end and having a single horizontal cavity of a substantial length relative to its width dimensions, said closed end having means projecting therefrom for supporting and positioning the same in other devices, said open end being axially mounted through a radial flange having an axial flange projecting from the outer edge thereof toward the closed end of the mold, said axial flange containing means for removably locking the same to said other devices.

14. Molding apparatus of the character described which comprises a tubular mold being closed at one end and open at the opposite end and having a single horizontal cavity of a substantial length relative to its width dimensions, said closed end having means projecting therefrom for supporting and positioning the same in other devices, said open end being axially mounted through a radial flange having an axial flange projecting from the outer edge thereof toward the closed end of the mold, said radial flange containing a packing ring on the inside thereof between the tubular mold and the axial flanged edge, said axial flanged edge containing means for removably locking the same to such other devices.

15. Molding apparatus of the character described which comprises a tubular mold being closed at one end and open at the opposite end and having a single horizontal cavity of a substantial length relative to its width dimensions, said closed end having means projecting therefrom for supporting and positioning the same in other devices, said open end being axially mounted through a radial flange having an axial flanged edge projecting backwardly toward the closed end thereof, and a pivotal handle member mounted transversely of the open end on said radial flange.

NORMAN M. THOMAS.
WILLIAM J. TAYLOR.